March 29, 1966  E. NOEL  3,242,573
PROGRAMMING OF CUTTING OPERATIONS FOR SHEET MATERIAL
Filed July 15, 1963  5 Sheets-Sheet 1

INVENTOR
EDOUARD NOEL
BY Toulmin & Toulmin
ATTORNEYS

Fig. 5
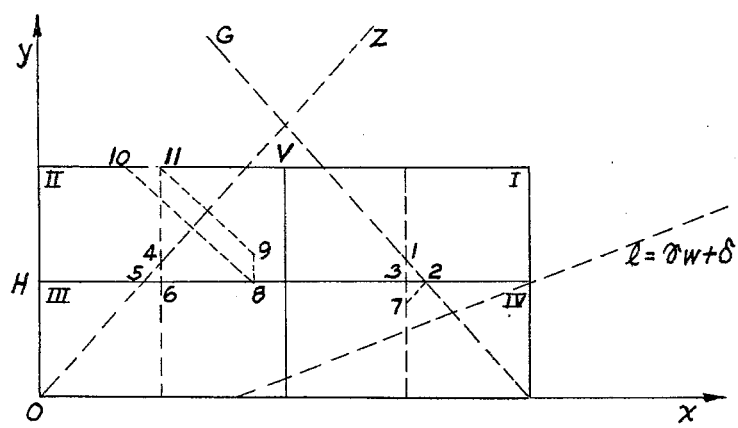
Fig. 6
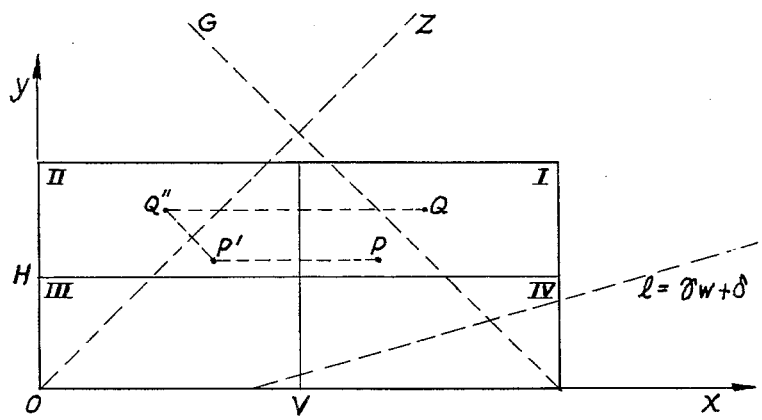
Fig. 6a
| ORDER BOOK | |
|---|---|
| QUANTITY | SIZE |
| 7 | P |
| 5 | Q |
| 10 | P' |
INVENTOR
EDOUARD NOEL March 29, 1966     E. NOEL     3,242,573
PROGRAMMING OF CUTTING OPERATIONS FOR SHEET MATERIAL
Filed July 15, 1963     5 Sheets-Sheet 4
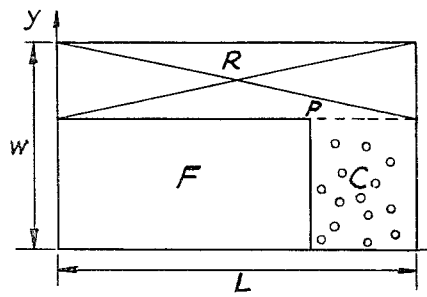
Fig. 7
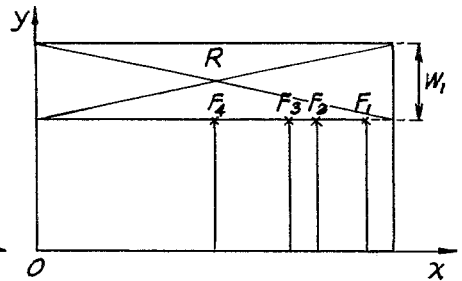
Fig. 11
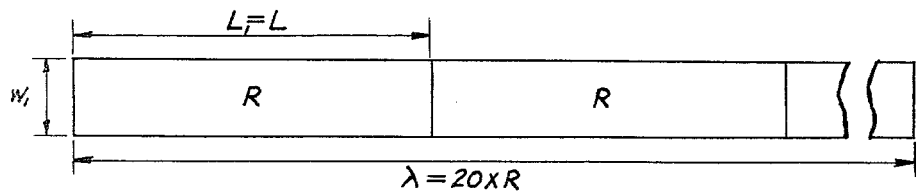
Fig. 8
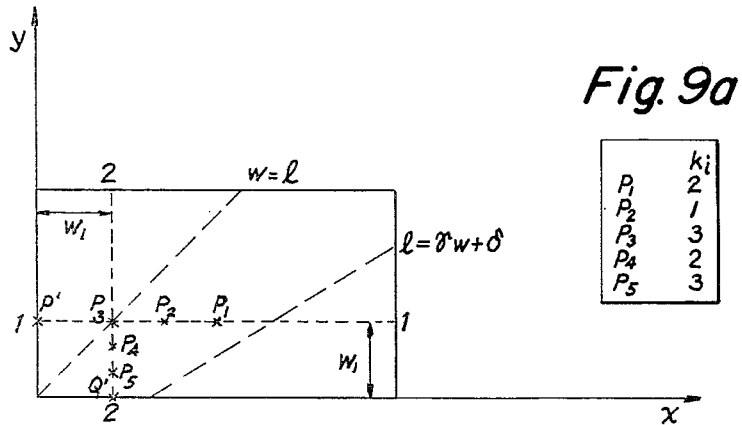
Fig. 9
Fig. 9a
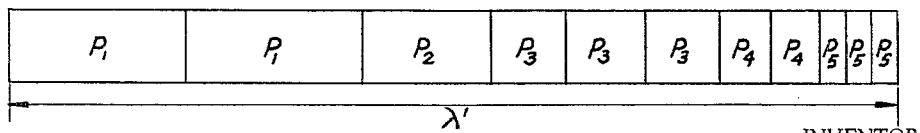
Fig. 10
INVENTOR
EDOUARD NOEL
BY Toulmin & Toulmin
ATTORNEYS March 29, 1966     E. NOEL     3,242,573
PROGRAMMING OF CUTTING OPERATIONS FOR SHEET MATERIAL
Filed July 15, 1963     5 Sheets-Sheet 5
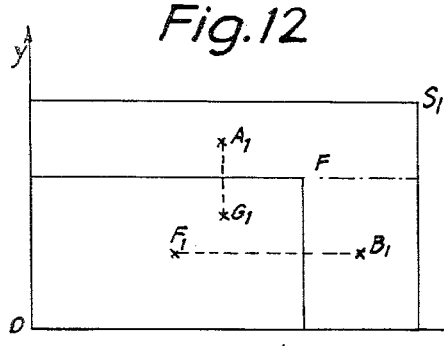
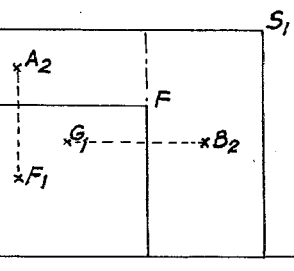
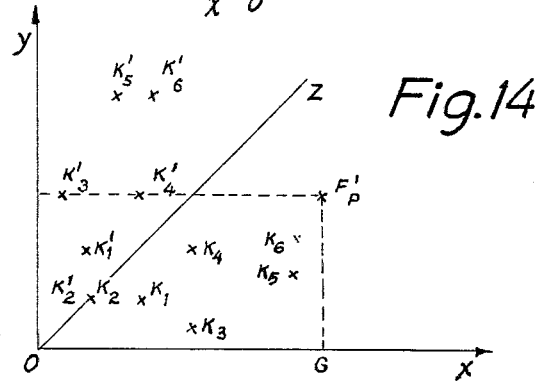
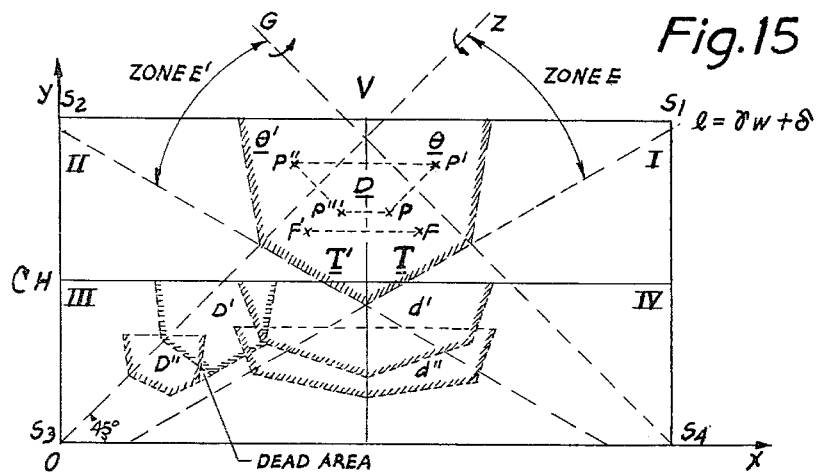
| 1 | $x = 360$ | $y = 168$ | $\rightarrow$ | $D$ | $, A$ |
|---|---|---|---|---|---|
| 2 | 180 | 84 | | $D'$ | $, A'$ |
| 3 | 120 | 56 | | $D''$ | $, A''$ |
| 4 | 90 | 42 | | $D'''$ | $, A'''$ |
Fig.16
INVENTOR
EDOUARD NOEL
BY Toulmin & Toulmin
ATTORNEYS

United States Patent Office 3,242,573
Patented Mar. 29, 1966

3,242,573
PROGRAMMING OF CUTTING OPERATIONS
FOR SHEET MATERIAL
Edouard Noel, Brussels, Belgium, assignor to
S.A. Glaverbel, Charleroi, Belgium
Filed July 15, 1963, Ser. No. 295,023
31 Claims. (Cl. 33—1)

The present invention relates to the cutting of sheet material according to required sizes, more particularly, to the programming of the sequence of cutting operations in order to cut blanks of sheet material into required numbers of predetermined sizes with a minium of waste.

The cutting of rectangular blanks of sheet material into rectangles or squares of smaller sizes is an important operation in certain industries such as the glass, metal, and mirror industries, in plants producing plastics, and in paper mills. The sizes to which the blanks of sheet material must be cut and the number of each size are determined primarily by the backlog of customer's orders for numbers of certain sizes of the material. Those required sizes are also determined by the requirement of the plant itself for inventory and stock purposes, or by use in other divisions of the plant. Since the required sizes are mainly dependent on customer's requirements, the orders for particular sizes and numbers thereof are continuously fluctuating.

The cutting of the sheet material blanks is done by a cutter. For the most effective cutting of the blanks into the required sizes, the cutter should have in mind the entire list of required sizes so as to be able to determine the best possible number and shape of sizes to be cut of each blank of material. Since this is not possible in practice, each cutter is assigned a portion of the required sizes and he cuts blanks of sheet materal according to his experience and skill in order to utilize as much as possible of each blank in order to fill the required sizes assigned to him. The list of required sizes is essentially an order book which consists of a variety of different sizes of material together with the number of each size which is desired.

In general practice, the cutter selects the largest piece from his portion of the order book and proceeds to cut out this piece from a blank. At this moment he is faced with the question of laying out the size on the blank of material since a rectangular piece can be positioned on one corner of a rectangular blank in either of two different ways. The cutter's decision at this point will effect the size of the pieces which can be cut from the remaining pieces from the blank.

The cutter is also faced with a second question at this time, which is whether his first cut should be made longitudinally or transversely on the blank.

It is therefore apparent that the cutter could follow any one of four cutting procedures in cutting the first required size from the rectangular blank. Bearing in mind that the required size is laid out in one corner of the rectangular blank, these procedures may be summarized as follows:

(1) Longitudinally positioning the size on the blank and making the first cut longitudinally on the blank;

(2) Positioning the size longitudinally on the blank and making the first cut transversely on the blank;

(3) Positioning the required size transversely on the blank and making the first cut longitudinally;

(4) Positioning the size transversely on the blank and making the first cut transversely.

These four cutting procedures are schematically illustrated in FIGURES 1a through 1d.

It is clear that when the length of the required size is greater than the width of the blank, there will be only two cutting procedures which could be followed since it will not be possible to lay out the required size transversely on the blank.

Irrespective of which cutting procedure is followed, each time a required size is cut from a blank, there will also be formed two remaining pieces. The size and shape of these remaining pieces will depend upon the cutting procedure followed. After cutting the first required size the cutter is now faced with the question of determining which other required sizes can now be most properly cut from the remaining pieces. Since the four cutting methods described above will result in eight rectangular remaining pieces, the cutter should consider which size could be most properly cut from each of the eight remaining pieces. Since the same procedure would be followed after each required size has been cut, it can be seen that the cutter is faced with a problem which rapidly goes beyond human resources. Thus the cutter is no longer in a position to determine which sizes could be most properly cut from blanks of sheet material.

When the blank has been cut so that no further required sizes can be obtained from any of the remaining pieces, it is then possible to calculate the yield or percentage of utilization of the blank. This yield is a ratio of the area of the cut sizes with respect to the area of the blank. Since this yield can be computed only upon completion of the cutting operation, it is not possible to control the cutting operation and the yield of the cutting operation remains largely within the discretion of the individual cutters.

The problem of the cutter is further compounded by constant fluctuation of the order book, since the composition of the order books, as largely determined by the sales departments, have no logical relationship to a profitable cutting of the blanks. Thus the fluctuating order book greatly effects the cutting yield.

Should the cutter optionally decide to employ the first cutting method in order to facilitate the cutting operation, i.e. longitudinal positioning of the size on the blank and the first cut being longitudinally on the blank, then the cutting of two different order books would furnish two different yields or utilization factors. When comparing these two different yields it is not possible to determine whether the scrap or non-utilized portion of the blank can be attributed to one or both of—

(1) The skill of the cutter in laying out the sizes on the blanks;

(2) The unadaptability of the order book to the cutting procedure employed by the cutter.

A further disadvantage of the conventional cutting method as described above results from the dimensions of the blanks with respect to the sizes which must be cut. By way of example, if the blank measures 300 x 400 cm. then a cutter can obtain one size of 300 x 300 plus one size of 300 x 100 cm. to obtain a cutting yield of 100%. But if the same size blank of 300 x 400 cm. is available and it is necessary to obtain one size of 300 x 300 cm. plus one size of 300 x 102 cm., then it is apparent that two blanks are required and the cutting yield decreases to 52.5%. This example, which is deliberately simplified, clearly shows that the dimensions of the blank should be a function of the order book in order to obtain the highest possible cutting yield. Thus, in practice the criteria of optimum cutting results, such as cutting yield, can be applied only after the cutting operation has been completed. The information obtained by thus supplying these criteria leads only to subjective considerations with respect to the composition of the order book, the dimensions of the blank, and the cutting procedures to be followed by the cutter.

The disadvantages of the conventional method as discussed above can be summarized as follows:

(1) Since the cutter is not provided with precise and accurate instructions for the cutting of the blanks, the cutting yield is dependent upon the human factor and varies for individual cutters.

(2) The order book of required sizes is not adapted to the most profitable cutting of the blanks since there is no relationship between the order book and the cutting procedures.

(3) The dimensions of the blanks bear no relationship to the required sizes, thereby making the cutting operation more complex and expensive and providing for no practical supervision of the cutters.

(4) There is no objective procedure for evaluating the adaptation of a particular order book to a cutting procedure.

It is therefore the principal object of the present invention to provide a novel and improved method for determining the most effective procedure for cutting sheet material into predetermined sizes according to requirements therefor.

It is another object of the present invention to provide a method for cutting sheet material wherein the yield of the cutting operation can be calculated before initiating the cutting.

It is a further object of the present invention to provide a method for cutting sheet material into required sizes wherein the list of required sizes can be objectively adapted to particular cutting procedures.

It is an additional object of the present invention to provide a method of cutting sheet material into required sizes wherein the human factor is largely eliminated and the cutting instructions to individual cutters can be prepared by electronic computers and the like.

It is still another object of the present invention to provide a simplified but effective method of programming the sequence of cutting operations in order to cut blanks of sheet material into required numbers of predetermined sizes with a minimum of waste.

The drawbacks of the prior art as discussed above are eliminated and the objects of the present invention are achieved by the present method for determinging the procedure of cutting blanks of sheet material into required sizes.

GENERAL SUMMARY OF METHOD OF THIS INVENTION

The method of the present invention essentially comprises the completely logical and objective procedure for programming the cutting of a required number of required sizes from rectangular blanks of sheet material with a minimum of waste of the sheet material. By employing the method of the present invention which will later be described in complete detail, it is now possible to determine before any cutting has begun, without any necessity for empirical determination, the most effective procedure for cutting the required sizes from blanks of sheet material in order to utilize the greatest percentage of the sheet material.

According to the present invention the first required size is laid out in a corner of a number of rectangular blanks of sheet material corresponding to the required number of this particular size. If the required size were now cut from the blank two remaining pieces would be obtained.

The list of required sizes is then examined to determine all of those required sizes which have widths equal to the widths of the remaining pieces or at least approximately equal to the widths of the remaining pieces. It is then determined by one of several different methods how many of these further required sizes can then be obtained from the first and second remaining pieces if the approximate number of first required sizes were cut from the blanks.

The amount of unused sheet material which would remain if these further required sizes were cut is then calculated.

The same procedure is then followed after the first required size is laid out on a corner of the rectangular blank in a different position, i.e., at 90° to the first-mentioned position, if the dimensions of the required size permit this. If only one position of the required size on the blank is possible, then the above procedure is followed for each of the two possible cutting procedures. In one cutting procedure the first cut is made longitudinally of the blank and the second cut transversely. In the second cutting procedure the first cut is made transversely of the blank and the second cut is made longitudinally.

The quantities of unused sheet material which would be obtained by each cutting procedure are then compared. That cutting procedure which results in the smallest quantity of unused material would then be utilized to cut the required sizes from the sheet material.

When the required number of the first required size has been determined, the same procedure is then repeated to determine all of the required sizes from the list of sizes.

While the first required size may be arbitrarily selected from the list of required sizes, it is preferable that the required size be the largest one which can be cut from a blank of sheet material. In this manner the larger required sizes are first obtained and the cutting procedure results in obtaining progressively smaller required sizes. This procedure facilitates laying out smaller required sizes on the remaining pieces.

Suitable instructions for carrying out the selected cutting procedure are then formulated and attached to each blank of sheet material. The cutter then follows these instructions for cutting each blank. Since these instructions are based upon the most effective use of the blanks of sheet material as has already been determined before any cutting is commenced, it can be readily appreciated that the cutter does not depend upon his own judgment and experience but cuts the sheet material in the most effective way which has been calculated in great detail.

While the above represents the essential procedure of the present invention, the invention can be carried out by any one of several different procedures. These procedures are essentially geometrical or arithmetic in nature.

Several different procedures and modifications thereof for carrying out the present invention will subsequently be described in detail.

SUMMARY OF GEOMETRICAL PROCEDURE

A geometrical procedure for carrying out this invention essentially comprises the laying out of rectangular co-ordinates and then positioning a rectangular blank of sheet material on the co-ordinates in such a manner that the length of the blank corresponds with the abscissa axis and the width of the blank corresponds with the ordinate axis. Thus, one corner of the blank will correspond with the origin of the co-ordinates and the width and length thereof will be superposed upon the ordinate and abscissa axes respectively.

The rectangular blank is then divided into four quadrants by drawing central transverse and longitudinal axes through the rectangular blank. When the blank is positioned in this manner with respect to the rectangular co-ordinates, the entire blank may be represented on the co-ordinates by a single point which corresponds with the corner of the blank diagonally opposite from the corner superposed on the origin of the co-ordinates.

A required size from the order book is then laid out on the blank by laying out the size on the corner of the blank corresponding with the origin of the co-ordinates. The required size is so chosen that its representative point, as described above, is located in quadrant I. This means that the required size is such that only one piece of this size can be cut from a rectangular blank.

After cutting the required size from the blank the two remaining pieces are then similarly positioned upon the rectangular co-ordinates. From each remaining piece there is then cut a further required size whose width is equal to or approximates the width of the respective remaining piece.

In order to conform the cutting operation to the order book, the representative points of all of the required sizes in the order book are laid out on a set of rectangular co-ordinates upon which a rectangular blank has also been laid out. A numeral corresponding to the number required of each particular size is positioned next to its corresponding representative point.

A small zone is then laid out in quadrant I which encloses the representative points of several required sizes. A second zone is then laid out in one of the other quadrants so as to be symmetrical to the first zone about at least one axis of the rectangular blank. The second zone also encloses a number of reference points of required sizes. By cutting those sizes in the first and second zones whose required numbers most closely coincide, the blanks could be most profitably cut in order to fulfill a portion of the order book.

If, after the required number of first sizes were cut, it would be necessary to cut additional second sizes in order to fulfill the required number thereof, a third zone is then laid out in the first quadrant which is symmetrical to the second zone about at least one axis of the rectangular blank. This indicates a required large size which could be cut in order that the remaining pieces may be employed to obtain the additional second sizes.

By proceeding in this manner a definite relationship is obtained between the sizes which could be cut since the sequence in which the required sizes are to be cut depends upon the size of each required piece plus the number required of these pieces.

SUMMARY OF ARITHMETIC PROCEDURE

In this procedure a first required size is laid out in a corner of a number of blanks of sheet material corresponding to the required number of this first required size. If the required size were now cut by making the first cut longitudinally of the blank and the second cut transversely of the blank, two remaining pieces would be obtained. The number of these remaining pieces would be equal and would also be equal to the number of the obtained first required size.

The first remaining pieces whose lengths are equal to the length of the rectangular blank are then placed end-to-end to form a strip of band. This strip, it is understood, is not continuous but represents the total of the lengths of the first remaining pieces.

The list of required sizes or order book is then examined to find all of those required sizes having at least one dimension equal to the width of the above-mentioned strip of remaining pieces. All of these required sizes having this common width are then placed end-to-end to form another strip. The lengths of these two strips are then compared.

It is to be appreciated that since the strip of remaining pieces is not continuous, all of the required sizes forming the second strip could not be cut from the remaining pieces and accordingly small waste pieces will be formed. However, the comparison of the strip of remaining pieces will indicate whether the required sizes comprising the second strip can be cut after making a due allowance for the above-mentioned waste pieces. This allowance is based on past experience and can be readily computed for various sheet materials.

If the lengths of the strips when compared indicated that the required sizes can all be cut from the remaining pieces this cutting procedure is then adopted.

The entire operation is then repeated by selecting a second required size from the list of required sizes. The aforementioned operation is then carried out until all of the sizes listed in the order book have been obtained.

In order to determine the most effective cutting procedure for a given list of required sizes, the operation as outlined above for the first required size is carried out for each of the at least two possible cutting procedures. That cutting procedure resulting in the greatest utilization of the sheet material is then adopted.

SUMMARY OF MODIFIED GEOMETRIC PROCEDURE

A modification of this method is also disclosed by which it is possible to obtain the greatest number of largest required sizes from blanks having predetermined dimensions.

In this procedure each size in the order book is represented by two points on the rectangular co-ordinates. One point represents the center of the size when positioned longitudinally on the blank, and the second point represents the center of the size when positioned transversely on the blank. According to this procedure one can determine the largest size which can be cut from a blank without basing the determination upon the position of the required size on the blank. Thus with this procedure the pieces which would remain after a size were cut from a blank are merely translated to the origin of the co-ordinates and are not rotated so as to be positioned longitudinally of the blank as is done in the above-mentioned geometrical procedure.

SUMMARY OF COMBINED GEOMETRICAL AND ARITHMETIC PROCEDURE

A further method for the programming of the sequence of cutting operations includes an improved geometrical procedure. The pieces remaining from each blank sheet after certain required sizes have been cut are then processed according to the arithmetic procedude as described previously in order to utilize these remaining pieces with a minimum of waste.

In this procedure, the required sizes as listed in the order book are plotted on a blank of sheet material and define a diverging zone extending from the lower left hand corner of the blank. This diverging zone is then symmetrically positioned on the blank with respect to the central vertical axis of the blank. The common portions of the diverging zone and its symmetrical position form an area and portions of this area are in turn symmetrically positioned. Several other areas are formed on the blank sheet and in the diverging zone which areas bear definite relationships to the first area. Thus, by combining several of the smaller required sizes listed in the order book it is possible to provide a number of sizes whose reference points falls in the fundamental area.

When these required sizes have been laid out on the blank, the remaining pieces are then placed lengthwise to form a strip and other required sizes from the order book are laid out on the strip in accordance with the arithmetic procedure previously described.

Other objects and advantages of the present invention will be apparent upon reference to the accompanying description when taken in conjunction with the following drawings, wherein:

FIGURE 5 is a graph showing the manner in which symmetrical zones are laid out on a rectangular blank;

FIGURE 6 is a graph showing the manner in which required sizes in an order book are successively cut;

FIGURE 6a is a table showing order book entries associated with the graph of FIGURE 6.

FIGURE 7 pertains to an arithmetic procedure of cutting required sizes and shows the remaining pieces resulting from the cutting of a required size from a blank;

FIGURE 8 illustrates a strip formed by placing the first remaining pieces as cut according to FIGURE 7, when these remaining pieces are placed end-to-end;

FIGURE 9 is a graph illustrating the position of the required sizes which can be cut from the remaining pieces resulting from the cutting of FIGURE 7;

FIGURE 9a is a table showing order book entries associated with the graph of FIGURE 9.

FIGURE 10 shows a second strip formed by placing end-to-end the required sizes having at least one dimension equal to the width of the first strip shown in FIGURE 8;

FIGURE 11 is a graph showing several different required sizes all of which produce the same size remaining piece; and FIGURES 12, 13 and 14 are graphs illustrating a modified geometrical method of cutting required sizes from a blank; and FIGURE 15 is a graph of a combined geometrical and arithmetic method illustrating the laying out of required shapes which are to be cut from a blank;

FIGURE 16 is a table associated with the graph of FIGURE 15.

DESCRIPTION OF GEOMETRIC PROCEDURE

The comprehension of the present invention will be greatly facilitated by first discussing in detail a procedure for carrying out the present invention on a geometrical basis. This detailed description will clarify the concept of the present invention and presents but one specific embodiment of carrying out the present process. Further, this detailed description of the geometrical procedure defines many of the terms employed in the description of this invention and contains explanatory material which applies equally to other procedures for carrying out this invention.

Figure 1A:
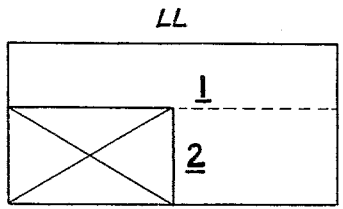
FIGURES 1a through 1d show schematically the various cutting procedures possible in cutting a required size from a blank of sheet material.
Figure 1B:
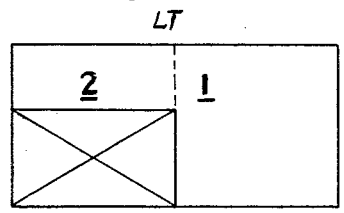
Figure 1C:
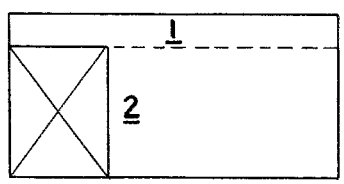
Figure 1D:
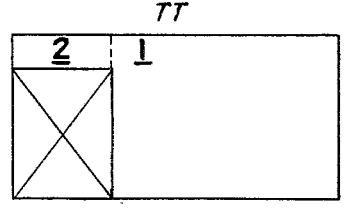

FIGURES 1a through 1d represent the four possible orientations and cutting orders for cutting a rectangular piece from a rectangular blank. In each of these figures, the line 1 represents the first cut to be made and the line 2 represents the second cut. FIGURE 1a represents the case (LL) where the piece is laid out with its length parallel to the length of the blank and the first cut is to be parallel to this length. FIGURE 1b represents a case (LT) where the length of the piece is parallel to the blank length and the first cut is in the direction of the width. FIGURES 1c and 1d represent cases (TL and TT, respectively) where the length of the piece is parallel to the width of the blank. In FIGURE 1c the first cut is parallel to the length of the blank, while in FIGURE 1d this first cut is parallel to the width thereof.

In the present invention the blank of sheet material will be considered as a rectangle, since the square blank is merely a special form of a rectangle. The blank is defined by its length L and its width W. Each of the sizes contained in the order book can be defined by a long side $l$ and a short side $w$. The number required of each particular size is indicated in the order book by its frequency K. Required square sizes are adapted to the rectangular sizes merely by designating two opposite sides as $l$ and the other two opposite sides by $w$.

A set of rectangular co-ordinates having an x-axis (abscissa) and a y-axis (ordinate) with an origin O are laid out on a suitable plane surface. A blank of sheet material $S_1$, $S_2$, $S_3$, and $S_4$ is drawn to scale on the rectangular co-ordinates in such a manner that the corner $S_3$ is superposed on the origin O. Thus the side $S_3$, $S_4$ is superposed on the x-axis and the side $S_2$, $S_3$ is superposed along the y-axis. According to the present procedure the blank is always laid out on the co-ordinates so that a length of the blank is superposed on the x-axis and one corner of the blank coincides with the origin of the co-ordinates. According to this standard, the rectangular blank can then be represented on the co-ordinates by only a single point. Thus, a single point unequivocally defines a single rectangular size on the co-ordinates.

Referring to the order book, each size contained therein is then represented on the blank by a single point in a manner as described above. Adjacent to the representative point for a particular size is placed a number indicating the frequency K with which this particular required size must be cut in order to fulfill the order book. The required sizes in the order book will include squares ($l=w$) as well as elongated rectangles wherein $l:w$ is greater than $l$. The ratio of the length to the width can be represented as $\gamma$, and $\gamma$ may have values such as 2, 2.5, 3, etc.

Figure 2:
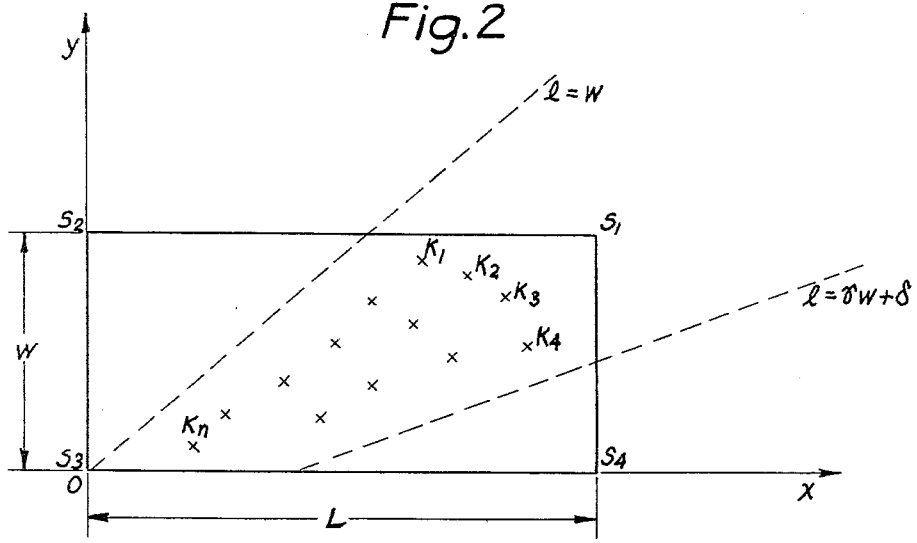
FIGURE 2 is a graph illustrating the manner in which the required sizes of an order book are laid out with respect to a blank of a predetermined size.
Figure 3:
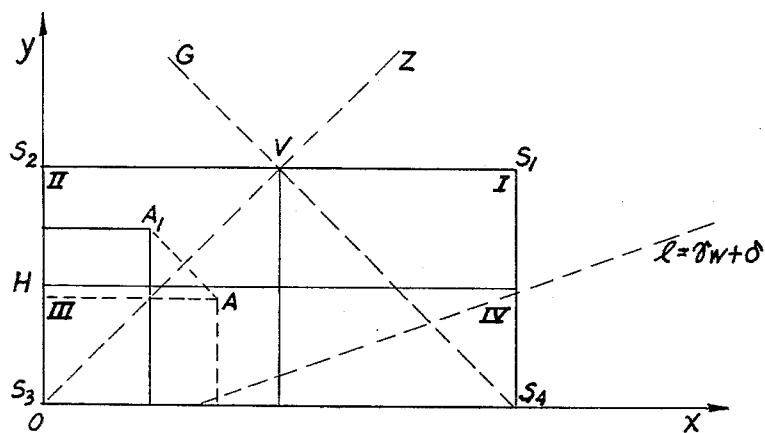
FIGURE 3 is a graph showing the manner of representing a size on a rectangular blank wherein the size has been rotated so that the length thereof extends longitudinally of the blank.

All of the representative points indicating square sizes will fall on the line $l=w$ and represented by Z (e.g. FIGURE 3). The required sizes having the greatest degree of elongation will define a straight line $l=\gamma w + \delta$, which relationship can be indicated as $l=f(w)$. Thus, all the required sizes in the order book will be represented between these two limits which form a diverging zone. The resulting chart is illustrated in FIGURE 2.

A central vertical axis V is then drawn transversely through the rectangular blank and a central horizontal axis H is drawn longitudinally through the rectangular blank. These axes symmetrically divide the rectangular blank into four quadrants indicated I–IV.

Since one standard of this procedure is that all rectangular sizes will be positioned on the rectangular co-ordinates with their length superposed upon the x-axis, it is apparent that no representative point of such a size will fall in the space between the y-axis and the line Z. However, it is possible that after a size has been cut from a blank and the remaining piece is translated along the x-axis until it is in the position as indicated by its representative point $A_1$, this point is located in that area between the y-axis and the line Z. In accordance with this method the remaining piece is then rotated 90° into the position as indicated by the dash lines in FIGURE 3. The remaining piece can then be indicated by the representative point A. It is pointed out that the point A is symmetrically positioned with respect to point $A_1$ with respect to the line Z. Therefore, the line Z is designated as an axis of symmetry and is employed in positioning points on either side thereof. When a rectangular piece is rotated into the position indicated by the dash lines in FIGURE 3, in effect, its point $A_1$ is symmetrically positioned with respect to the axis of symmetry (Z), to obtain the point A. It will be apparent that both $A_1$ and A represent sizes which are identical. As will be later described, the axes H and V, as well as the line G, which is perpendicular to the line Z are all employed as axes of symmetry in the cutting operation.

The sizes of the various pieces of material which are involved in the cutting operation may be designated as follows:

(1) Prime—a piece whose size is such that only one can be cut from a single blank and a representative point of which is located in quadrant I.

(2) Medium—sizes whose representative points are located in quadrants II, IV.

(3) Small—sizes whose representative points are located in quadrant III.

The above classification of sizes is used not only for required sizes contained in the order book, but for pieces remaining after required sizes have been cut from the blanks.

Figure 4:
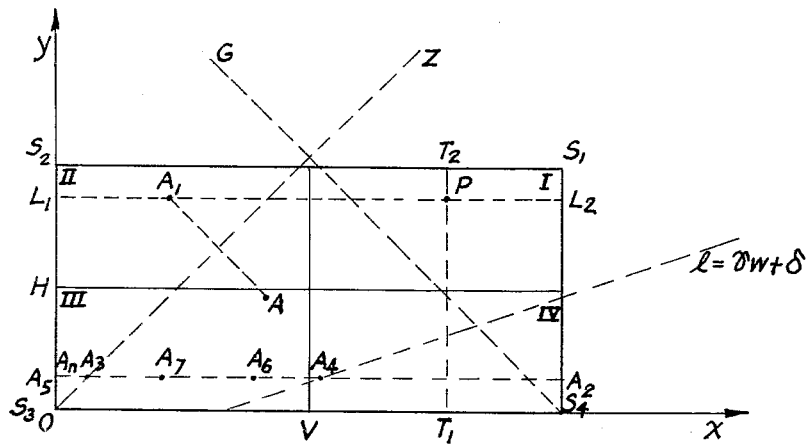
FIGURE 4 is a graph showing the manner in which a blank is cut so as to obtain the highest number of largest required sizes.

Proceeding next to FIGURE 4, a prime size P of material is to be cut from a rectangular blank $S_1$. Since the prime size P has a length greater than the width of the blank S, it is apparent that the prime size P can be obtained from the blank by either one of two cutting procedures, i.e. the first cut longitudinally of the blank or the first cut transversely of the blank. In this particular example the first cut is made longitudinally of the blank along the line $L_1$, $L_2$ from one edge of the blank to the other edge thereof. In this manner a first remaining piece $L_1$, $L_2$, $S_1$, $S_2$ is obtained which is to be utilized later.

The second cut is transversely of the rectangular blank and is made along the line $T_1$, P by which is obtained the prime piece P and the remaining piece $T_1$, P, $L_2$, $S_4$ which will be later utilized.

In the event the other cutting procedure was employed then the cutter would obtain a first remaining piece $T_1$, $T_2$, $S_1$, $S_4$ which is to be later employed, the prime size P, and a second remaining piece $L_1$, $S_2$, $T_2$, P which is to be later utilized.

The first cutting procedure which is being followed in this example, results in a remaining piece $T_1$, P, $L_2$, $S_4$ whose representative point is $A_1$ when the remaining piece has been translated horizontally until the edge P, $T_1$ coincides with the y-axis of the co-ordinates. As seen in FIGURE 4, the distance $L_1$, $A_1$ is equal to the distance P, $L_2$. Therefore the distance of the point $A_1$ to the axis V is equal to the distance of the point P to the axis V. It is thus apparent that the point $A_1$ is symmetrical to the point P with respect to the vertical axis V. This means that when a prime size is cut from a blank by a longitudinal cut as a first cut, one of the remaining pieces can be represented by a point which is symmetrical to the representative point of the prime size with respect to axis V.

In the same manner the representative point of the second remaining piece $S_1$, $S_2$, $L_1$, $L_2$ is located at $A_2$ which is symmetrical to the point $L_2$ with respect to the H-axis. This is true since $S_4$, $A_2$ is equal to $L_2$, $S_1$. Since the point $A_1$ is positioned outwardly of the axis Z it is not included within the range of sizes in the order book. Accordingly, the point $A_1$ is replaced by the point A which is symmetrical to $A_1$ about the Z-axis. Since the point A is located within the range of sizes in the order book, a second required size can be readily cut from piece A in a manner as described in connection with the cutting of prime size P.

The remaining size $A_2$ is not within the range of sizes in the order book. However, several sizes in the order book are included whose widths are positioned along the line $A_3$, $A_4$ and these sizes could be cut from the remaining piece $A_2$. Dividing the length $S_3$, $S_4$ by the segment $A_3$, $A_4$ an integral number and a remainder is obtained. The integral number will represent the number of the largest sizes $A_4$ of the width $A_2$, $S_4$ which can be obtained from the remaining piece $A_2$.

The remainder is then divided by the length of the next largest size on the line $A_3$, $A_4$ which in this case is $A_6$. The resulting remainder is processed in the same manner and after a definite number of cutting operations there is obtained from the remaining piece $A_2$ a definite number of required sizes and a remainder whose representative point falls outwardly of the axis P and must be considered as scrap. It is pointed out that there is only a definite number of required sizes which can be obtained along the line $A_3$, $A_4$.

This remaining piece indicated as $A_N$ is a minimum in this particular cutting procedure since for a given prime size this procedure will furnish the highest number of the largest sizes which can be cut from a particular blank. The layout operation as described above can be followed for each of the prime sizes existing in the order book. Using the 3 other cutting procedures for the prime size P would probably produce other sizes and other remainders. But employing the method as described above, the highest number of the largest sizes would be obtained from a given blank for each cutting procedure.

Thus, for each prime size in the order book similar layout operations can be followed for a maximum of 4 cutting procedures for each prime size. Each cutting procedure would probably give a different yield or utilization factor. Therefore by considering each cutting procedure possible, for a given prime size, one would obtain either two or four yields. It is then apparent that one would select a cutting procedure for a given prime size which has the highest yield so as to produce the lowest scrap from the rectangular blanks.

Since the prime sizes in the order book are limited, and since each prime size might be cut according to a maximum of 4 cutting procedures, it is possible to establish an ideal order book which would have the highest yield and would produce the highest number of the largest sizes. This concept of an ideal order book is of value for it enables one to determine the minimum and small sizes which are most properly obtained from the prime sizes. It is to be noted that the ideal book is established before commencing any cutting of the sheet material blanks, since the selection of the cutting procedure producing the highest yield is made on the basis of the layout operations as described above. In addition, by selecting the cutting procedure on the above basis, the number of cutting lines is held to a minimum since the cutting principle is based on the production of the largest sizes with respect to the remaining pieces. Thus the human factor is eliminated from the cutting operation and the judgment of the cutter is replaced by a series of instructions based on the above layout, which instructions are given prior to the actual cutting operation. Based upon these instructions, the plant management will have an accurate picture of the result to be obtained of the cutting operation before the cutting operation has even begun.

It is unlikely, however, that the sizes obtained by following a cutting procedure which gives the greatest yield, will coincide with those sizes and required number thereof as contained in the order book. However, by using the various axes of symmetry which may be inscribed upon the blank in a manner to be presently described, a predetermined relationship may be established between a prime size cut from a blank and the successive sizes obtained during the cutting operation.

With references to FIGURE 4, if there are required $K_n$ prime sizes P, then one would also obtain $K_n$ pieces $A_1$. With reference to the axis of symmetry H, there are also obtained $K_n$ times of the number of smaller sizes cut from the $K_n$ pieces $A_2$. Basing the cutting operation on all of the prime sizes contained in the order book and utilizing the axes of symmetry as discussed above, one would then obtain the highest number of the largest sizes with a minimum of waste and a minimum of cutting lines.

By employing another cutting procedure, such as making a first cut transversely of the blank, for the prime sizes other medium and small sizes would be obtained. It is therefore apparent that each representative point of a medium or small size can be derived from different prime sizes cut according to different procedures. Thus, the surface of the blank can be divided into particular zones with the representative points enclosed in these zones having symmetrical relationships with respect to the several axes of symmetry. These axes of symmetry include not only the H and V axes, but the axis Z and the axis G which extends from the corner $S_4$ of the blank and is perpendicular to the axis Z. All of the polygons formed in quadrant I by these axes of symmetry or by positioning these axes of symmetry symmetrically about each other will have definite relationships to each other.

With reference to FIGURE 5, the triangle 1, 2, 3 in quadrant I is formed by the H axis, the G axis, and the axis V' which extends through the midpoint of quadrant I. Symmetrically positioning the axes G and V' with respect to the axis V there will be obtained the triangle 4, 5, 6 in quadrant II. This means that all of the representative points of the prime sizes located in the zone defined by triangle 1, 2, 3 have their equivalent points in the triangle zone 4, 5, 6 in quadrant II. Further, the frequency of the representative points located in zone 4, 5, 6 will be at least equal to the frequency of the prime representative points in zone 1, 2, 3 when the prime sizes are cut in a predetermined cutting procedure. When the frequency of a point in triangle zone 4, 5, 6 is greater than the frequency of its corresponding point in the triangle zone 1, 2, 3, this means that the additional representative points in triangle 4, 5, 6, have been derived from prime sizes not positioned in the triangle 1, 2, 3 and that the additional points in 4, 5, 6 have been introduced therein by utilizing other axes of symmetry. Thus, a relationship is established between the prime sizes in an order book and the medium sizes which should be cut from the remaining piece after cutting of the prime size.

With this relationship in mind the sequence in which the required sizes in an order book are to be cut can now be precisely determined.

With reference to the actual order book as it exists at a particular time, one would lay out symmetrical zones, such as the triangle 1, 2, 3 and 4, 5, 6 as shown in FIGURE 5. By employing the particular cutting procedure, for example, making the first cut on the blank longitudinally thereof, there would be obtained a first quantity of sizes whose representative points coincide with each other and are located in the triangular zones. When a pair of corresponding points in these two triangular zones has been noted, blanks are then cut to obtain that size which is the lowest frequency of that corresponding pair of points.

When additional uncut sizes remain in the zone 4, 5, 6 of quadrant II, the zone 4, 5, 6 is then rotated around the axis of symmetry B and additionally rotated around the axis of symmetry V to correspond to a second zone in quadrant I. This means that prime sizes located in the second zone of quadrant I will correspond to uncut medium sizes still required by the order book.

When uncut prime sizes still remain in zone 1, 2, 3 they must be placed in corresponding relation with other zones so as to determine which small or medium sizes can be cut which correspond to these uncut prime sizes. By way of example the zone 1, 2, 3 is positioned symmetrically with respect to the axis of symmetry H to obtain triangle 1, 2, 3.

In addition the other axes of symmetry can also be used in a like manner and other cutting procedures can be employed in order to conform the required sizes in the order book to each other. Thus by applying this symmetrical positioning about the axis of symmetry Z, all of the representative points positioned in the triangular zone 1, 2, 3 will provide a series of medium sizes whose width can be represented on the line 8, 9, which is symmetrical with 10, 11 above the axis Z. By following the above described rules of symmetry with respect to corresponding zones, there is obtained a method to fill the requirements of the actual order book by a quantity of sizes so cut from blanks as to furnish the largest number of the greatest sizes with the highest yield.

By way of further explanation, reference is made to FIGURE 6 and to FIGURE 6a showing an order book which contains two prime sizes P and Q. The order book is as follows: 7/P, 5/Q, 10/P'. By employing the cutting procedure wherein the first cut is longitudinally of the blank, it can be seen that P' is the corresponding point of P and is located in the zone defined by the axis Z and the line $l = \gamma w + \delta$ which zone represents the orders of the book.

Cutting of 7 pieces of a prime size P in a manner as described above, there will be formed 7 medium pieces P'. As a result, it is necessary to provide 3 additional pieces of the size P'. The symmetrical positioning of P' with respect to the axis of symmetry Z is the point Q". The sizes P' and Q" are identical. As a result, the remainder of the 3 uncut pieces of size P' are transferred to Q". The symmetrical position of Q" with respect to the axis V is the prime size Q of which 5 pieces are required by the order book. The cutting of 3 pieces of the prime size Q will furnish the remaining 3 pieces of Q" which as we have seen is identical to medium size P'. At this point, the order book may be divided into two parts—the balanced and the unbalanced part. The balanced part of the order book comprises the 7 pieces of prime size P, the 3 pieces of prime size Q, and 10 medium pieces P'. The unbalanced part comprises two pieces of prime size Q remaining to be cut, which would provide 2 surplus pieces of the medium size P'.

More specifically, the order book is balanced with respect to the adapted cutting procedure, because the requirements for prime size P and medium size P' have been filled. The unbalanced part of the book contains the two sizes P' which are not required by the existing order book.

To fulfill the unbalanced part of the order book another cutting procedure is employed, or if possible, a different positioning of the prime sizes is used. Further, it is possible to employ a different sequence for the comparison of corresponding zones relating to the axes of symmetry. As a result of this modified procedure a new quantity of corresponding sizes is obtained and another partially balanced book will be the result.

The sizes which remain to be obtained are then processed in a manner as described above. Since the number of cutting procedures and the sequences of comparison are definite, it will be possible to obtain all of the corresponding sizes existing in the order book. In actual practice the layout operation is limited by employing the various possible cutting procedures.

This process will enable one to obtain from the actual order book a so-called balanced book which provides all of the elements necessary for a precise cutting of the sheets with a high yield and a remaining quantity of so-called unbalanced book, which is a measure of imperfection of the real order book as compared to the aforementioned ideal order book. In some cases it will be quicker and cheaper to turn over the unbalanced order book to the cutters, who will then cut out the remaining sizes according to their conventional practice. Since these remaining sizes would be a relatively small quantity, this job lot procedure would be satisfactory.

DESCRIPTION OF ARITHMETIC PROCEDURE

The required size F is longitudinally positioned in the origin corner of a rectangular blank of sheet material, as shown in FIGURE 7. If this required size were cut by making the first cut longitudinally of the blank and the second cut transversely of the blank, remaining pieces R and C would be formed. The required size F is arbitrarily chosen from the order book but it is preferable that the largest size on the order book be selected.

If the order book called for 20 pieces of size F, it is apparent that there would be obtained 20 remaining pieces R and 20 remaining pieces C.

All of the remaining pieces R are then placed end-to-end so as to form a strip $\lambda$, the length of which is equal to 20 times the length L of the blank, as shown in FIGURE 8. Thus $\lambda$ indicates the sum of the lengths of the remaining pieces R.

In a similar manner the remaining pieces C are placed in end-to-end position, i.e. along their shorter dimensions, to form another strip. Thus cutting the required number of the size F according to this cutting procedure would produce two strips, with one strip comprising the remaining pieces R and a second strip of the remaining pieces C. The strip formed from the remaining pieces R is designated $\lambda_{1P}$ and the other strip designated $\lambda_{2P}$. The subscript P indicates that the remaining pieces are obtained by cutting the required size having the representative point P.

The list of required sizes in the order book is then examined and all of the required sizes having at least one dimension which is equal to the width of the strip $\lambda_{1P}$ are selected. These required sizes have the width $W_1$ and are indicated in the order book as shown in FIGURE 9. All of the sizes in the order book having this width are located on the lines 1—1 and 2—2 of the co-ordinate axes traced at a distance $W_1$ from the respective axes as shown in FIGURE 9. FIGURE 9a shows order book entries indicating the number of pieces $K_i$ required for each length P. All of these sizes are then joined end-to-end as shown in FIGURE 10 to form a second band indicated $\lambda'$.

The same procedure is followed with respect to the strip formed of the remaining pieces C so that two additional strips $\lambda'_{1P}$ and $\lambda'_{2P}$ are formed.

As can be seen in FIGURE 10, this strip is not continuous but is composed of a plurality of pieces corresponding to the required sizes having at least one dimension equal to the width of the remaining pieces comprising the strip.

It is pointed out that the strip $\lambda$ results from a particular cutting procedure and depends upon the size P, the frequency of this size in the order book, and the dimensions of the blank sheet, but is independent of other sizes in the order book which do not correspond to P. On the other hand, a strip $\lambda'$ results from operations according to the order book and is independent of the frequency of the size P in this order book.

Thus, the cutting of each size in the order book according to a particular cutting procedure will result in two pairs of strips with one pair corresponding to remaining piece R and the other pair corresponding to remaining piece C. In each pair of strips of the same width one of the strips results from the cutting procedure (strip $\lambda$) and the other strip from the results from the order book (strip $\lambda'$).

If $\lambda = \lambda'$, then the surface area of the required sizes can be obtained from the remaining pieces of this width. As a practical matter, however, this does not mean that the required sizes can all be obtained from the remaining pieces since it is readily apparent that the junctures between the required sizes will seldom correspond to the junctures between the remaining pieces. Therefore, cutting of the required sizes from the remaining pieces will produce small waste pieces which cannot be used. Thus, even though the areas of the two strips are equal, it is clear that the required sizes cannot all be obtained from the remaining pieces. In order to obtain the required sizes of the strip $\lambda'$, it is necessary that a greater number of remaining pieces R be used than positioned in the strip $\lambda$. This relationship between $\lambda'$ and $\lambda$ can be represented by the equation: $[\lambda = (1+\alpha)\lambda']$ wherein $\alpha$ is a non-negative coefficient having the relationship $$(0 < \alpha < 1)$$

The value of $\alpha$ is based upon past experience in cutting the sheet material. This coefficient is essentially a correction factor which would enable one to determine the length of a strip $\lambda$ required in order to cut the required sizes comprising a strip $\lambda'$. The value of the coefficient $\alpha$ is verified after the entire cutting operation has been completed and can then be adjusted for subsequent order books according to the results obtained from the actual cutting operation with the adjusted value depending on other important criteria including geometric relationships and economic considerations.

In general, the greater the variety of smaller sizes, the smaller will be the value of $\alpha$. With smaller sizes, the value of $\alpha$ will be smaller. After many cutting operations, $\alpha$ may be weighted or modified so that an accurate value of $\alpha$ is obtained. Further, after many cutting operations, it is possible to establish an accurate value of $\alpha$ for a particular range of sizes.

It is to be observed that if one required size in excess of the required frequency is cut, the strip $\lambda$ is extended by a remaining piece R. The reverse result is obtained where one size less than the required frequency is cut. Thus it is possible to vary the length of the strip $\lambda$ whereas the length of the strip $\lambda'$ which is formed from the required sizes remains the same.

By comparing the lengths of the strips $\lambda$ and $\lambda'$ with respect to the same cutting procedure, the following conclusions can be drawn:

(1) If $\lambda = (1+\alpha)\lambda'$, then all of the required sizes comprising the strip $\lambda'$ can be obtained from the remaining pieces comprising the strip $\lambda$.

(2) If $\lambda < (1+\alpha)\lambda'$, then it would not be possible to obtain the required sizes comprising $\lambda'$ from the total length of the remaining pieces comprising the length $\lambda$.

(3) If $\lambda > (1+\alpha)\lambda'$, then all of the required sizes comprising the strip $\lambda'$ can be obtained from the remaining pieces comprising the strip $\lambda$ with some sheet material being left over.

The repeated cutting of one size P according to one cutting procedure will result in two strips $\lambda_{1P}$ and $\lambda_{2P}$ which must be compared to the corresponding strips $\lambda'_{1P}$ and $\lambda'_{2P}$ obtained from the order book. It is to be understood that if the cutting of a required size results in the remaining pieces having the same width then only two strips instead of four will be the result.

When the lengths $\lambda$ and $\lambda'$ of the two strips of the same width are substantially equal after application of the correction factor $\alpha$, the cutting procedure can then be carried out without any substantial waste of sheet material. This relationship should exist between the strips of the two different widths of remaining pieces. While this double requirement will rarely occur, it is possible to establish a criterion for evaluating the cutting procedure for obtaining a required number of a required size. This criterion is based upon the minimum acceptable difference between the lengths of the two strips of the same width.

By way of example, it may be cited that whether a particular cutting procedure is to be adopted or rejected will depend on whether the difference $(\lambda - \lambda')$ is smaller than a predetermined amount, based on past experience. This will enable one to be assured that by adopting this cutting procedure for all of the required sizes in the order book there will not occur any excessive waste in the sheet material.

Another alternative may comprise an absolute difference of the measure such as, for example, the difference $(\lambda - \lambda')$ cannot exceed a predetermined length or distance.

The minimum differences depend upon the cutting of a required size according to its frequency as set forth in the order book by which the lengths of the strips $\lambda$ and $\lambda'$ are determined.

It is therefore apparent that with this procedure it is possible to determine in advance the waste of any material which cannot be exceeded. The differences between the strips will vary according to the required sizes and it is pointed out that the smaller sizes occurring more frequently in the order book will produce smaller differences, i.e. less waste, than the sizes required less frequently. This is readily understood since the loss in one size will never exceed the surface of a blank minus the surface of the cut size, whereas the loss in one repeated cutting will effect a large number of blanks.

Thus, the cutting procedure is adopted when the differences between the bands of the same width are smaller than, or equal to, the minimum difference which has previously been determined to be acceptable.

The required size is then cut from the number of blanks corresponding to the frequency of this size as set forth in the order book. After this required size has been cut and after the required sizes have been cut from the strips formed from the remaining pieces, a new order book is established comprising all of the previous required sizes and their frequency minus the sizes which have just been cut.

The cutting operation is then repeated by selecting another size from the order book and carrying out the aforementioned determinations with respect to the remaining pieces. These operations are then carried out until all of the sizes in the order book have been obtained.

It is again emphasized that the above determinations are carried out for each possible cutting procedure for that required size. Where one cutting procedure will result in an excess of waste sheet material this cutting procedure can be immediately rejected. In most cases, however, where the length of the required size is less than the width of a blank, a maximum of four different cutting procedures (see FIG. 1) could be employed. Thus these computations are carried out for each of the possible cutting procedures and the most effective one, i.e. yielding the least waste, is then adopted. These computations are all carried out by machines, such as computers, before any actual cutting is done. These computations are not made by the cutters themselves, but the cutters merely cut the sheets based on instructions resulting from the machine-made computations.

It may occasionally occur that the cutting of a required size in the frequency as set forth in the order book will result in a difference between strips of the same width which is greater than the minimum admissible difference. When fewer than the required frequency of a size are cut, then only the lengths of the strips $\lambda$ will be effected, but the strips $\lambda'$ will be unaffected.

The number of the required sizes which are to be cut will be increased below the required frequency of these sizes to the point when the new strip $\lambda$ and the constant strip $\lambda'$ form an admissible minimum difference.

Where the strips $\lambda$ are too short and must be increased, the number of required sizes above the required frequency can be increased to the same point.

It is therefore apparent that by varying the number of required sizes which are to be cut, either above or below the required frequency of sizes, one will either obtain a number of extra pieces of a required size or the completed order book will lack several required sizes. These conditions, however, are relatively trivial since they form the basis of a rational cutting of the required sizes in the order book. The extra sizes will still result in a filling of the order book with a minimum of waste sheet material. Where a few required sizes are lacking after the order book has been filled, these sizes can then be cut individually on a job lot basis.

With reference to FIGURE 11 it can be seen that four sizes, $F_1$, $F_2$, $F_3$, $F_4$ will each furnish an identical remaining piece R when the first cut is made longitudinally of the blank. Thus where sizes in the order book have a common dimension these sizes are combined in order to produce identical remaining pieces. This procedure is advantageously employed where there is an unusually high requirement for sizes having the dimension $W_1$ as shown in FIGURE 11. The necessary remaining pieces could not be obtained from the cutting of a single size by artificially increasing the number of the size which is to be cut, as previously described, since this will result in an extraordinary excess of this size piece. The required remaining pieces R are obtained by simultaneously considering those required pieces having the common dimension.

If, in the example as illustrated in FIGURE 11, a cutting procedure has been rejected because the difference between the lengths of the strips with respect to the remaining pieces R and the size $F_3$ was not admissible, one is then in a position to modify the number of pieces cut of the size $F_3$ in order to obtain an admissible difference.

While this modified process has been described as utilizing required sizes whose widths are equal to the widths of the strips formed from the remaining pieces, it is to be pointed out that it is not necessary to limit the widths of the required sizes to this identical relationship. The widths of the required sizes must approximate the widths of the strips of remaining pieces, and it can be appreciated that those widths of the required sizes are selected which are less than, but closer to, the widths of the blanks of the remaining pieces. This increases the flexibility of this cutting procedure.

DESCRIPTION OF MODIFIED GEOMETRIC PROCEDURE

With reference to FIGURES 12, 13 and 14 there will next be described a modified method of cutting a blank having predetermined dimensions, in order to obtain the greatest number of the largest sizes from the blank. As may be seen in FIGURE 12, it is desired to obtain a size F from the blank of sheet material whose representative point is point $S_1$ and whose geometrical center and center of gravity is indicated at $G_1$. Positioning of the size F longitudinally of the blank S and making the first cut longitudinally of the blank, as shown in FIGURE 12, there is obtained two remaining pieces whose centers are indicated as $A_1$ and $B_1$. If the first cut is made transversely as shown in FIGURE 13, 2 remaining pieces will be obtained whose centers are indicated as $A_2$ and $B_2$.

If the length of the size F is less than the width of the blank $S_1$ then the size F could also be placed transversely of the blank and 2 additional cutting procedures followed wherein the first cut is made longitudinally and in the other procedure wherein the first cut is made transversely of the blank. These two cutting procedures would provide additional pairs of points $A_3$, $B_3$ and $A_4$, $B_4$.

The cutting of the size F from the blank $S_1$ therefore would furnish 2 or 4 pairs of points $A_i$, $B_i$ which represents the pieces of the blank remaining after the respective cutting procedures.

The co-ordinates of the centers $G_1$, $F_1$ are readily determined from the known dimensions of the blanks $S_1$ and the size F. Since in each cutting procedure the cutting lines are parallel with resepec to the $x$- and $y$-axes, the co-ordinates of the pairs of points $A_i$, $B_i$ are readily derived from the co-ordinates of $F_1$ and $G_1$.

In this modified method each required size in the order book is represented by two points as may be seen in FIGURE 14. The first of these points represents the center of the size positioned longitudinally of the blank and accompanied by its frequency K as set forth in the order book. The second representative point corresponds to the center of the size when positioned transversely of the blank and also provided with the same frequency K'. For purposes of clarity the second representative point is indicated by the symbol (') as applied to the frequency.

From a given blank $F_p$ of sheet material represented by the point $F'_p$ in FIGURE 14, it is therefore possible to obtain any one of the required sizes whose representative points are located below or upon the straight line $F'_p$, P and be left of or upon the straight line $F'_p$, G. All of the representative points located within this area represent sizes whose maximum dimensions are equal at the most to those of the blank $F_p$. Since both positionings of the required sizes with respect to the blank have been considered, all of the sizes in the order book which can be obtained from the blank $F'_p$ are located either in this rectangular area or on the edges thereof. Thus, with reference to the co-ordinates of the center $F'_p$ which define the rectangular area as indicated above, it is possible to eliminate those required sizes which cannot be obtained from the blank $F_p$.

The products of the co-ordinates of the representative points remaining within the rectangular area, i.e. areas, are then subtracted from the corresponding products of the co-ordinates of the point $F'_p$. The smallest difference resulting from this subtraction will indicate the largest required size of material which can be obtained from the blank $F'_p$.

After cutting the required size from the blank, the remaining pieces are tanslated parallel to either the $x$- or $y$-axis until each remaining piece has its two adjacent sides superposed upon the axis of the rectangular co-ordinates. The remaining pieces are not rotated during this translation so when positioned with the corner thereof on the origin of the co-ordinates they occupy the same relative position that they formerly occupied when first cut from the blank. The positions of these remaining pieces after the translations thereof are indicated with (′) so that $A_i$ becomes $A'_i$. The same procedure is then followed with the representative points of the remaining pieces as was followed with respect to the representative points of the required size in order to determine the largest required sizes which can be obtained from the respective remaining pieces.

The difference between the products of the co-ordinates of each of the points of a pair of points $A_i$, $B_i$ and the product of the co-ordinates $F_p$ can be calculated as described above and the sum of the differences for each pair of points is then figured. The pair of points $A_i$, $B_i$ having the smallest sum will provide the ltargest required sizes. On the basis that this minimum sum is unique, the pair of points having the smallest sum will indicate the most advantageous cutting procedure for the required size F.

It will occasionally occur that calculations of the difference of the products of each point $A_i$ or $B_i$ or the calculations of the sum of the differences of the products of each pair of points will give the same minimum results. Therefore, in order to determine the most effective cutting procedure, the calculations are continued with the required sizes and different cutting procedures until the obtained results are different. That cutting procedure is employed which results in the smallest waste of a blank in cutting the required sizes. In the event two pairs of representative points give the same minimum scrap area, it is immaterial which of the cutting procedures is selected.

After the cutting procedure has been determined on the above described basis, the quantity of the cut sizes are removed from the order book by correspondingly reducing the frequencies of the representative points of each size.

It is generally possible to progressively determine the sizes which are to be cut from a given blank by determining a cutting procedure prior to each cutting of a new size contained in the order book. However, it is also possible to determine the cutting procedure after examining the remaining pieces of the blank after successive cuttings of the required sizes or when none of the required sizes contained in the order book can be cut from any of the remaining pieces.

Thus, the described method will enable one to determine the most effective cutting procedure for obtaining the highest number of the largest sizes contained in a given order book.

DESCRIPTION OF THE COMBINED GEOMETRIC AND ARITHMETIC PROCEDURE

In order to carry out this procedure of programming the cutting operations a blank of sheet material $S_1$, $S_2$, $S_3$, $S_4$ is laid out on a set of rectangular co-ordinates in such a manner that the corner $S_3$ is superposed on the origin O as may be seen in FIGURE 15. Thus the side $S_3$, $S_4$ of the blank is superposed on the $x$-axis and the side $S_2$, $S_3$ is superposed along the $y$-axis.

With reference to the order book, each size contained therein is represented on the blank by a single representative point and adjacent to each point is placed a number indicating the frequency K with which this particular required size must be cut in order to fulfill the order book. All of these required sizes will fall in a diverging zone or area E bounded by the line Z and a straight line $(l=\gamma w+\delta)$ which is the limit of the required sizes having the greatest degree of elongation.

In a manner as described previously, the diverging zone E is symmetrically positioned with respect to the central vertical axis V of the blank so as to form a diverging zone E′. The area common to the zones E and E′ can be said to be divided into two halves T and T′ by the central vertical axis V. The area T is then symmetrically positioned with respect to the line G to form the area $\theta$ and the area T′ is symmetrically positioned with respect to the line Z to form the area $\theta'$. The areas $\theta$ and $\theta'$, and T and T′ then define a fundamental area designated as D.

This fundamental area D has the following characteristics.

(1) If a required size F falls in the fundamental area D then the remaining piece F′ will also fall in this fundamental area, and conversely.

(2) Representative points F and F′ are symmetrical with respect to the central vertical axis V.

(3) If representative point P′ is located in area $\theta$, then point P″ falls in $\theta'$ and positioning P″ symmetrically with respect to line Z will locate this point into the area T′ and P‴.

(4) If the required size P and its remaining piece P‴ are listed in the order book with the same frequency K then cutting the blank according to the procedure of FIGURE 1a will give the most effective results, providing that it will be possible to make use of the long remaining pieces having a length L (the length of the blank).

(5) If the size P is listed in the order book with a frequency of $K_1$, the size P′ with the frequency $K_2$, and the size P‴ with the frequency $K_1+K_2$, then all of these sizes can be obtained in their proper quantities with the best utilization of the sheet material, that is to say, without the production of any scrap and at the most efficient price of cutting per size. The order book is then sent to be balanced in length with respect to the cutting of the three sizes P, P′ and P‴, with respect to the first and second quadrants of the blank. This balance is characterized by the equation $K_1+K_2=K_3$.

In the practical application of laying out the programming of the cutting operation, the co-ordinates (abscissas and ordinates) of the fundamental area D can be subdivided in two and a corollary area D′ is obtained as can be seen in FIGURE 15 of the drawings. All groups of four identical sizes having their reference points located in corollary area D′ will provide a size having its representative point in fundamental area D.

It is apparent that the abscissas and ordinates of the fundamental area D can be divided by 3, by 4, and so forth, so as to obtain the corollary areas D″, D‴, etc. The area D‴ has not been shown in order to avoid confusing the drawing. This grouping operation is applicable to the sizes located in these corollary areas. For area D″, the number of small sizes is not $2\times2=4$, but $3\times3=9$, etc. (Operation No. 2). Therefore, by grouping nine identical required sizes whose reference point is located in area D″ so that the reference point of the grouping is located in fundamental area D one can concentrate the grouping of representative points in the fundamental area D and each cutting of the size would result in nine smaller required sizes. FIGURE 16 is a table showing the coordinates obtained by dividing the coordinates of a sample area D by 2, 3 and 4.

Depending on the requirements of the order book, it is apparent that only the ordinates of the fundamental area D could be divided by 2, by 3, or by 4, so as to obtain new corollary areas $d'$, $d''$, $d'''$. The area $d'''$ has not been shown in order to avoid confusing the drawing. Thus, if two identical sizes having points located in $d'$ are grouped vertically side-by-side, a shape is required whose representative point is located in fundamental area D. This procedure (Operation No. 3) has the particular advantage of locating into fundamental area D all, or some of groupings of required sizes located in the quadrant IV.

Those portions of the diverging zones or fans not included in the corollary areas constitute so-called "dead areas" with respect to operations Nos. 2 and 3 as described above.

These aforementioned operations have the following advantages:

(1) Concentrating representative points of required sizes and groups of required sizes in fundamental area D before dividing the order book (Operation No. 1).

(2) To considerably reduce the final minimum scrap resulting from following cutting procedure shown in FIGURE 1a.

(3) To permit consideration not only of the required sizes located in fundamental area D, but on required sizes having representative points throughout the entire area of the diverging zone except in those dead spaces with respect to cutting procedure, FIGURE 1a.

While the above programming efficiently utilizes major portions of the blanks of sheet material, there still remain pieces having lengths L equal to the length of the blank. These long remaining pieces result from the particular cutting procedure as shown in FIGURE 1a wherein required sizes positioned longitudinally of the blank and the first cut is made longitudinally of the blank.

When the first required sizes are cut from the blanks according to procedure LL (FIGURE 1a), all those required sizes are retained which have the same width $p$. The number of these required sizes is designated as $Y$. Accordingly, all remaining pieces which are formed have widths of $p'=W-p$. By positioning these remaining pieces end-to-end a strip having a total length of $\lambda=L.Y.$ is obtained.

For the most effective utilization of these remaining pieces, all those small required sizes which have a width of exactly $p'$ are placed end-to-end on the strip or remaining pieces and these required sizes are then formed by cutting this strip transversely.

With reference to the order book, all those small required sizes having a common width $p'$ are positioned end-to-end so as to form a strip having a total length of $\lambda'=\epsilon k'g'$ wherein $g'$ represents the lengths of the various sizes to be considered.

If the long remaining pieces could all be cut without any waste then the condition $\lambda=\lambda'$ would exist which would indicate that the available remaining pieces having the width $p'$ are sufficient for providing all of the small required sizes having the width $p'$. However, this is seldom the case since the required sizes cannot be cut along the ends of the remaining pieces, and accordingly, this relationship can more accurately be expressed as $$\lambda=(1+\alpha)\lambda'$$

wherein $\alpha$ is correction factor as discussed above in the arithmetic procedure.

If this condition could be satisfied for all values of $p$ and $p'$, it would mean that the long remaining pieces could be used under most favorable conditions and the order book would be balanced with respect to the small required sizes and to the large remaining pieces resulting from cutting the first required sizes from the original blanks according to the procedure of FIGURE 1a.

If a width $p$ and a corresponding width $p'$ are considered, only three cases are possible:

(1) $\lambda=(1+\alpha)\lambda'$. There is no problem since all of the required sizes comprising the strip $\lambda'$ can be obtained from the remaining pieces comprising the strip $\lambda$.

(2) $\lambda<(1+\alpha)\lambda'$. Here it would not be possible to obtain all of the small required sizes of width $p'$ from the long remaining pieces.

(3) $\lambda>(1+\alpha)\lambda'$. Here all of the required sizes of the width $p'$ can be obtained from the remaining pieces with some sheet material being left over.

With respect to situation (2), it is possible to improve the balancing of the order book. This is done by grouping four small required sizes $p'$, $g'$ in such a manner so as to comprise a size of length $2g'$ and width $2p'$. This is similar to Operation No. 2 described previously. If this resulting required size is located in the fundamental area as described above, then two results will occur which will improve the balancing of the order book.

(a) The number of remaining pieces having a length L will be increased by one unit and $\lambda$ would become equal to $L(Y+1)$.

(b) On the other hand, the length of the strip $\lambda'$ would be decreased by $4g'$.

This operation can be carried out until condition (1) is achieved or closely approximated, unless it becomes necessary to stop the operation because in required sizes having a width $p'$ only remain frequencies below 4.

The entire problem of cutting required sizes from blanks of sheet material may be referred to as a question of linear programming in integral positive numbers in a two dimensional space. The solution of this problem is exceedingly difficult. However, the methods disclosed herein reduce the problems to simpler operations and in finite numbers.

The advantage of this combined geometrical and arithmetic procedure is theat linear programming in integral positive numbers in a one dimensional space can be carried out by utilization of the long remaining pieces as described above. Furthermore, this method is practical since a finite number of simple operations can be carried out to prepare the entire order book for an effective and profitable cutting operation.

GENERAL DESCRIPTIVE MATERIAL

The present invention also enables the determination of the most suitable dimensions of the blank for fulfilling a particular order book. With respect to the cutting of glass for mirrors, for example, the lengths of the blank may be progressively varied by suitable increments according to the machinery used, such as by 1 cm. Many forms of sheet material such as glass and plastics are produced in continuous strips having a constant width. It is therefore in practice a relatively easy matter to vary the length of the blanks into which the continuous strips must be cut.

It is then possible through the use of electronic computers and other computing instruments to carry out the layout operation as described above for each successive length of a blank in order to determine the most suitable blank length for cutting sizes of a particular order book. Since the length of the blank is limited by practical considerations, it can be seen that there is a definite number of blank lengths for which this computation must be carried out. However, with the existence of computers and the like in practice these computations can be readily made prior to the actual cutting operation. Thus, instead of utilizing blanks cut to an arbitrary selected length with the use of this method one can select the length of the blank which would give the highest yield for a particular order book.

It is apparent that as a general observation order books are not uniform with respect to the sizes of the pieces which must be cut, but various sizes may have certain common dimensions. It is therefore clear that by placing two sizes together along a common dimension two different sizes may be obtained with only three cutting lines. Thus, the present method also discloses that the order book must be studied to search out certain common dimensions, to put these sizes together length to length or width to width so that the common dimensions coincide and to consider the resulting obtained cut piece as a size existing in the order book but bearing in mind that this size will eventually be cut in order to provide the two required sizes listed in the book.

While the present method as disclosed above may require many different combinations in making the necessary computations, it is pointed out that these combinations can be limited to a definite number by practical considerations. An electronic computer can thus provide a large but finite number of improved order books based upon an actual order book.

Thus, for each actual order book, which in actual practice may be the backlog of orders existing at a predetermined time, the aforementioned operations can be repeated so as to determine the cutting procedure which should be followed and to determine the most effective dimensions of the blank of sheet material. The various yields resulting from the different calculations can then be compared and that cutting operation followed which gives the greatest yield which is the most effective utilization of the sheet material in order to fill the existing orders.

The method of the present invention enables the following determinations to be made from blanks whose dimensions have been arbitrarily preselected and based on any order book:

(1) An improved order book which provides the greatest number of the largest sizes which can be extracted from the acual order book with the best yield and the smallest number of cutting lines.

(2) The optimum dimensions of the blank of sheet material.

(3) Accurate and precise instructions for each cutter thereby eliminating the need for relying upon the judgment and experience of the individual cutter.

In practice, once the cutting operation has been computed by electronic equipment, cutting instructions can be attached to each blank of sheet material when these blanks are sent to the cutting department. In this way the cutting operation proceeds immediately upon receipt of the blanks and their respective instructions without any necessity for the cutters to make any determination with respect to the cutting operation.

Further, the subject invention provides for an accurate control of the cutting operation since the yield of the sheet material is computed and known in advance. In addition, the determination of an ideal order book will reveal which sizes of material can be most profitably cut. Therefore, efforts can be made by the sales organization to obtain orders for those sizes which can be most profitably cut so that the actual order book may be made to conform as close as possible to the ideal order book.

While the cutting methods herein described have been devised in order to obtain the most effective utilization of a blank sheet, they may also be used to determine the most profitable manner of cutting a blank. It is apparent that the most profitable size of sheet material is not necessarily the largest one. When several of the required sizes contained in the order book cannot be cut from the remaining pieces as determined by the above-mentioned procedure, one would then select the size to be cut which would be most profitable to the manufacturer. Thus, it may be determined that several different sizes have essentially the same value when sold in the market. Accordingly, cutting instructions should be given to cut that size which has the smallest area since this will increase the total value of the sizes which are cut from the blank. Alternatively, when several sizes have the same value, cutting instructions could be given to cut that size which is required the greatest number of times in the order book, thereby facilitating the cutting operation.

All of the aforementioned calculations with respect to the sizes which should be cut are made in a separate calculating operation preferably through the use of electronic computers. The results of these calculations, however, are translated into cutting instructions which instructions are attached to each blank of material. Since the cutting procedures are determined prior to sending the blanks to the cutting department, it is necessary only that the cutting department cut the blanks according to the specific instructions received for each blank.

It will be understood that this invention is susceptible to modification in order to adapt it to different usages and conditions and, accordingly, it is desired to comprehend such modifications within this invention as may fall within the scope of the appended claims.

What is claimed is:

1. In a method of programming the sequence of cutting operations in order to cut blanks of sheet material into required numbers of predetermined sizes with a minimum of waste, the steps of laying out a required size of sheet material on a corner of a rectangular blank of sheet material, determining the sizes of the pieces of the sheet material which would remain if the required sizes were cut from the blank according to each of the several possible cutting procedures, comparing the pieces which would remain from each cutting procedure with other required sizes after the required number of the first required size have been obtained, and selecting the cutting procedure for the first required sizes which would result in the smallest difference between the remaining pieces and the other required sizes.

2. In a method of programming the sequence of cuttion operations in order to cut blanks of sheet material into required numbers of predetermined sizes with a minimum of waste, the steps of laying out on a corresponding plurality of rectangular blanks a required number of a required first size whose size is such that only one of such size could be cut from a blank, laying out on the remaining pieces of said plurality of blanks a number of a required second size whose size is such that more than one of such size can be cut from a blank and whose width is closest to the width of the respective remaining piece, and laying out on additional rectangular blanks a required number of a required third size whose size is such that only one of such size could be cut from a blank and whose size is also such that additional required second sizes could be cut from the remaining pieces.

3. In a method of programming the sequence of cutting operations in order to cut blanks of sheet material into required numbers of predetermined sizes with a minimum of waste, the steps of laying out on a corresponding plurality of rectangular blanks a required number of a required first size so that first and second remaining pieces would be left from each blank if the first size were cut therefrom, laying out on the first remaining piece required sizes whose widths approximate the width of said first remaining piece, laying out on the second remaining piece required sizes whose widths approximate the width of said second remaining piece, laying out on a plurality of additional rectangular blanks the required number of a further required size, and laying out other sizes from the remaining pieces in a like manner so as to obtain the required numbers of all of the required sizes.

4. In a method of programming the sequence of cutting operations in order to cut blanks of sheet material into required numbers of predetermined sizes with a minimum of waste, the steps of laying out a first required size on a plurality of blanks of sheet material approximating the number of pieces required of that size so that first and second remaining pieces would be formed if the blanks were so cut, laying out on the first and second remaining pieces further required sizes whose widths approximate the respective widths of the first and second remaining pieces, determining the unused portions of said first and second remaining pieces after the required number of said first required size have been laid out on the blanks, selecting the cutting of the required number of said first required size and those of the further required sizes which results in the smallest unused portion of said first and second remaining pieces, and proceeding in the same manner with a second required size so as to obtain all of the required numbers of all of the required sizes.

5. In a method of programming the sequence of cutting operations in order to cut blanks of sheet material into required numbers of predetermined sizes with a minimum of waste, the steps of laying out a first required size on a plurality of blanks of sheet material approximating the number of pieces required of the first required size, longitudinally dividing the plurality of blanks to obtain first remainders and pieces of sheet material having a width equal to the width of the first required size, transversely dividing the pieces of sheet material at the length of the first required size to obtain the required size and second remainders, and dividing each remainder first longitudinally and then transversely to obtain further required sizes whose width is closest to the widths of the respective remainders.

6. In a method of programming the sequence of cutting operations in order to cut blanks of sheet material into required numbers of predetermined sizes with a minimum of waste, the steps of laying out a first required size on a plurality of blanks of sheet material approximating the number of pieces required of said first required size, determining the unused portions of sheet material if the required number of the first required size were obtained by the one cutting procedure of first longitudinally cutting the blanks and then transversely cutting the blanks and the other cutting procedure of first transversely cutting the blanks and then longitudinally cutting the blanks, after further required sizes have been laid on the remaining pieces whose widths approximate the widths of the remaining pieces, and subsequently dividing the blanks of sheet material and the remaining pieces according to that cutting procedure resulting in the smallest unused portion of sheet material.

7. In a method of programming the sequence of cutting operations in order to cut blanks of sheet material into required numbers of predetermined sizes with a minimum of waste, the steps of laying out a first required size on a corner of a plurality of rectangular blanks corresponding to the number of pieces required of that size so that first and second remaining pieces would be formed if the blanks were so cut, determining the differences between the sums of the lengths of said first and second remaining pieces if the required number of said first size were so cut and the total lengths of other required sizes whose widths are equal to the respective widths of said first and second remaining pieces, determining the differences between the sums of the lengths of said first and second remaining pieces obtained if the required number of said first required size were cut after being positioned in another way on said rectangular blank and the total lengths of other required sizes whose widths are equal to the respective widths of the thus obtained first and second remaining pieces, and selecting that cutting procedure of the first required size which would result in the smallest differences between the sums of the lengths of the remaining pieces and the total lengths of said other required sizes whose widths are equal to the respective widths of the remaining pieces.

8. In a method of programming the sequence of cutting operations in order to cut blanks of sheet material into required number of predetermined sizes with a minimum of waste, the steps of laying out a first required size on a corner of a plurality of rectangular blanks corresponding to the number of pieces required of that size so that first and second remaining pieces would be formed if the blanks were so cut, determining the differences between the sums of the lengths of said first and second remaining pieces if the required number of said first size were so cut and the total lengths of other required sizes whose widths are equal to the respective widths of said first and second remaining pieces, determining the differences between the sums of the lengths of said first and second remaining pieces obtained if the required number of said first required size were cut after being positioned in another way on said rectangular blank and the total lengths of other required sizes whose widths are equal to the respective widths of the thus obtained first and second remaining pieces, and selecting that cutting procedure of the first required size which would result in the smallest differences between the sums of the lengths of the remaining pieces and the total lengths of said other required sizes whose widths are equal to the respective widths of the remaining pieces, and laying out a further required size according to the same cutting procedure selected for cutting the first required size.

9. In a method of programming the sequence of cutting operations in order to cut blanks of sheet material into required numbers of predetermined sizes with a minimum of waste, the steps of laying out a first required size on a corner of a plurality of rectangular blanks corresponding to the number of pieces required of that size so that first and second remaining pieces would be formed if the blanks were so cut, determining the differences between the sums of the lengths of said first and second remaining pieces if the required number of said first size were so cut and the total lengths of other required sizes whose widths are equal to the respective widths of said first and second remaining pieces, determining the differences between the sums of the lengths of said first and second remaining pieces obtained if the required number of said first required size were cut after being positioned in another way on said rectangular blank and the total lengths of other required sizes whose widths are equal to the respective widths of the thus obtained first and second remaining pieces, selecting that cutting procedure of the first required size which would result in the smallest differences between the sums of the lengths of the remaining pieces and the total lengths of said other required sizes whose widths are equal to the respective widths of the remaining pieces, laying out a further required size according to the same cutting procedure selected for cutting the first required size, and proceeding in the same manner with other required sizes until the required numbers of all of the required sizes have been laid out.

10. In a method of programming the sequence of cutting operations in order to cut blanks of sheet material into required numbers of predetermined sizes with a minimum of waste, the steps of establishing an order book to include all the sizes of sheet material required at a given time and the number of pieces required of each size, laying out a first required size from the order book on a plurality of rectangular blanks corresponding to the number of pieces required of that size so that first and second remaining pieces would be formed if the blanks were so cut, determining the differences between the sums of the lengths of said first and second remaining pieces if the required number of said first size were so cut and the total lengths of other required sizes contained in the order book whose widths are equal to the respective widths of said first and second remaining pieces, determining the differences between the sums of the lengths of first and second remaining pieces obtained if the required number of said first size were cut after being positioned in another way on said blank and the total lengths of other required sizes whose widths are equal to the respective widths of the thus obtained first and second remaining pieces, selecting that cutting procedure of the first required size which would result in the smallest difference between the sums of the lengths of the remaining pieces and the total lengths of the other required sizes whose widths are equal to the respective widths of the remaining pieces, and establishing a new order book containing the sizes and numbers thereof of the first order book minus the sizes and numbers thereof which would have been cut from the blanks and remaining pieces therefrom.

11. In a method of programming the sequence of cutting operations in order to cut blanks of sheet material into required numbers of predetermined sizes with a minimum of waste, the steps of establishing an order book to include all the sizes of sheet material required at a given time and the number of pieces required of each size, laying out a first required size from the order book on a plurality of rectangular blanks corresponding to the number of pieces required of that size so that first and second remaining pieces would be formed if the blanks were so cut, determining the differences between the sums of the lengths of said first and second remaining pieces if the required number of said first size were so cut and the total lengths of other required sizes contained in the order book whose widths are equal to the respective widths of said first and second remaining pieces, determining the differences between the sums of the lengths of first and second remaining pieces obtained if the required number of said first size were cut after being positioned in another way on said blank and the total lengths of other required sizes whose widths are equal to the respective widths of the thus obtained first and second remaining pieces, selecting that cutting procedure of the first required size which would result in the smallest difference between the sums of the lengths of the remaining pieces and the total lengths of the other required sizes whose widths are equal to the respective widths of the remaining pieces, establishing a new order book containing the sizes and numbers thereof of the first order book minus the sizes and numbers thereof which would have been cut from the blanks and remaining pieces therefrom, and laying out another required size from the new order book and proceeding in the same manner until the required numbers of all of the required sizes have been laid out.

12. In a method of programming the sequence of cutting operations in order to cut blanks of sheet material into required numbers of predetermined sizes with a minimum of waste, the steps of laying out a first required size on a plurality of rectangular blanks approximately the number of pieces required of that size so that first and second remaining pieces would be formed if the blanks were so cut, determining the differences between the sums of the lengths of said first and second remaining pieces if the approximate number required of said first size were cut and the total lengths of other required sizes whose widths are equal to the respective widths of said first and second remaining pieces, and laying out that number of first required sizes which produces a predetermined difference between the sums of the lengths of the remaining pieces and the total lengths of the other required pieces whose widths are equal to the respective widths of the remaining pieces.

13. In a method of programming the sequence of cutting operations in order to cut blanks of sheet material into required numbers of predetermined sizes with a minimum of waste, the steps of laying out required sizes having a similar dimension on corners of a plurality of rectangular blanks approximating the numbers of the pieces required of those sizes so that the first and second remaining pieces are formed with one of said first and second remaining pieces being similar for the plurality of required sizes, determining the differences between the sums of the lengths of said first and second remaining pieces if approximately the required number of said required sizes were cut and the total lengths of other required sizes whose widths are equal to the respective widths of said first and second remaining pieces, and laying out that number of required sizes which produces a predetermined difference between the sums of the lengths of corresponding remaining pieces and the total lengths of the other required pieces whose widths are equal to the respective widths of the remaining pieces.

14. In a method of programming the sequence of cutting operations in order to cut blanks of sheet material into required numbers of predetermined sizes with a minimum of waste, the steps of laying out required sizes having a similar dimension on corners of a plurality of rectangular blanks approximating the numbers of the pieces required of those sizes so that the first and second remaining pieces are formed with one of said first and second remaining pieces being similar for the plurality of required sizes, determining the differences between the sums of the lengths of said first and second remaining pieces if approximately the required number of said required sizes were cut and the total lengths of other required sizes whose widths are equal to the respective widths of said first and second remaining pieces, laying out that number of required sizes which produces a predetermined difference between the sums of the lengths of corresponding remaining pieces and the total lengths of the other required pieces whose widths are equal to the respective widths of the remaining pieces, and varying the number of pieces which would be cut of one of said required sizes so that the difference between the sums of the lengths of said first and second remainding pieces when the approximate required numbers of said required sizes were cut and the total lengths of other required sizes whose widths are equal to the respective widths of said first and second remaining pieces falls within predetermined limits.

15. In a method of programming the sequence of cutting operations in order to cut blanks of sheet material into required numbers of predetermined sizes with a minimum of waste, the steps of laying out required sizes having a similar dimension on corners of a plurality of rectangular blanks approximating the numbers of the pieces required of those sizes so that the first and second remaining pieces are formed with one of said first and second remaining pieces being similar for the plurality of required sizes, determining the differences between the sums of the lengths of said first and second remaining pieces if approximatly the required number of said required sizes were cut and the total lengths of other required sizes whose widths are equal to the respective widths of said first and second remaining pieces, laying out that number of required sizes which produces a predetermined difference between the sums of the lengths of corresponding remaining pieces and the total lengths of the other required pieces whose widths are equal to the respective widths of the remaining pieces, and varying the number of pieces which would be cut of one of said required sizes so that the difference between the sums of the lengths of said first and second remaining pieces when the approximate required numbers of said required sizes were cut and the total lengths of other required sizes whose widths are equal to the respective widths of said first and second remaining pieces falls within predetermined limits, laying out said obtained size on a plurality of rectangular blanks corresponding to the number of pieces required of that obtained size so that first and second remaining pieces would be formed if the rectangular blanks were so cut, determining the differences between the sums of the lengths of said first and second remaining pieces when the required number of said obtained sizes has been cut between the sums of the lengths of corresponding remaining pieces and the total lengths of the other required pieces whose widths are equal to the respective widths of the remaining pieces, varying the number of pieces which would be cut of one of said required sizes so that the difference between the sums of the lengths of said first and second remaining pieces when the approximate required numbers of said required sizes were cut and the total lengths of other required sizes whose widths are equal to the respective widths of said first and second remaining pieces falls within predetermined limits, laying out said obtained size on a plurality of rectangular blanks corresponding to the number of pieces required of that obtained size so that first and second remaining pieces would be formed if the rectangular blanks were so cut, determining the differences between the sums of the lengths of said first and second remaining pieces when the required number of said obtained sizes has been cut and the total lengths of other required sizes whose widths are equal to the respective widths of said first and second remaining pieces, determining the differences between the sums of the lengths of said first and second remaining pieces obtained when the required number of said obtained size has been cut after being positioned in another way on said rectangular blank and the total lengths of other required sizes whose widths are equal to the respective widths of the thus obtained first and second remaining pieces, and cutting the obtained size according to the cutting procedure which results in the smallest difference between the sums of the lengths of corresponding remaining pieces and the total lengths of the other required sizes whose widths are equal to the respective widths of the remaining pieces and the total lengths of other required sizes whose widths are equal to the respective widths of said first and second remaining pieces, determining the differences between the sums of the lengths of said first and second remaining pieces obtained when the required number of said obtained size has been cut after being positioned in another way on said rectangular blank and the total lengths of other required sizes whose widths are equal to the respective widths of the thus obtained first and second remaining pieces, and cutting the obtained size according to the cutting procedure which results in the smallest difference between the sums of the lengths of corresponding remaining pieces and the total lengths of the other required sizes whose widths are equal to the respective widths of the remaining pieces.

16. In a method of programming the sequence of cutting operations in order to cut blanks of sheet material into required numbers of predetermined sizes with a minimum of waste, the steps of laying out required sizes having a similar dimension on corners of a plurality of rectangular blanks approximating the numbers of the pieces required of those sizes so that he first and second remaining pieces are formed with one of said first and second remaining pieces being similar for the plurality of required sizes, determining the differences between the sums of the lengths of said first and second remaining pieces if approximately the required number of said required sizes were cut and the total lengths of other required sizes whose widths are equal to the respective widths of said first and second remaining pieces, laying out that number of required sizes which produces a predetermined difference.

17. In a method of programming the sequence of cutting operations in order to cut blanks of sheet material into required numbers of predetermined sizes with a minimum of waste, the steps of lying out a first required size on a corner of a plurality of rectangular blanks corresponding to the number of pieces required of that size so that first and second remaining pieces would be formed if the blanks were so cut, determining the differences between the sums of the lengths of said first and second remaining pieces if the required number of said first size were so cut and the total lengths of other required sizes whose widths are equal to the respective widths of said first and second remaining pieces, determining the differences between the sums of the lengths of said first and second remaining pieces obtained if the required number of said first required size were cut after being positioned in another way on said rectangular blank and the total lengths of other required sizes whose widths are equal to the respective widths of the thus obtained first and second remaining pieces, selecting that cutting procedure of the first required size which would result in the smallest differences between the sums of the lengths of the remaining pieces and the total lengths of said other required sizes whose widths are equal to the respective widths of the remaining pieces, and attaching instructions to each blank of sheet material stating that cutting procedure for the required size which results in the smallest difference between the sums of the lengths of the remaining pieces and the total lengths of the other required sizes whose widths are equal to the respective widths of the remaining pieces.

18. In a method of programming the sequence of cutting operations in order to cut blanks of sheet material into required numbers of predetermined sizes with a minimum of waste, the steps of laying out a rectangular blank of sheet material on rectangular co-ordinates with the length on the abscissa and the width on the ordinate, dividing the rectangular blank into four quadrants, similarly laying out a required size on the rectangular blank whose corner diagonally opposite from the corner corresponding to the origin of the co-ordinates is located in quadrant I, similarly positioning on rectangular co-ordinates those pieces which would remain if the required size were cut from the blank, and laying out from each remaining piece a further required size whose width is closest to the width of the remaining piece.

19. In a method of programming the sequence of cutting operations in order to cut blanks of sheet material into required numbers of predetermined sizes with a minimum of waste, the steps of laying out a rectangular blank of sheet material on rectangular co-ordinates with the length on the abscissa and the width on the ordinate, longitudinally dividing the blank to obtain a first remainder and a piece of material having a width equal to the width of the required size, transversely dividing the piece of material at the length of the required size to obtain the required size and a second remainder, laying out the first and second remainders of the cut blank on the rectangular co-ordinates, and laying out on each remaining piece a further required size whose width is closest to the width of the remaining piece.

20. In a method of programming the sequence of cutting operations in order to cut blanks of sheet material into required numbers of predetermined sizes with a minimum of waste, the steps of laying out a rectangular blank of sheet material on rectangular co-ordinates with the length on the abscissa and the width on the ordinate, longitudinally dividing the blank into a first remainder and a piece of material having a width equal to the width of the required size, transversely dividing the piece of material at the length of the required size into the required size and a second remainder, positioning the first and second remainders on the rectangular co-ordinates, and dividing each remainder first longitudinally and then transversely into a further required size whose width is closest to the width of the respective remainder.

21. In a method of programming the sequence of cutting operations in order to cut blanks of sheet material into required numbers of predetermined sizes with a minimum of waste, the steps of laying out a rectangular blank of sheet material on rectangular co-ordinates with the length on the abscissa and the width on the ordinate, longitudinally dividing the blank into a first remainder and piece of material having a width measured from the abscissa equal to the width of the required size, transversely dividing the piece of material at the length of the required size measured from the ordinate into the required size and a second remainder, similarly positioning said remainders on rectangular co-ordinates, and dividing each remainder into a further required size whose width is closest to the width of the respective remainder.

22. In a method of programming the sequence of cutting operations in order to cut blanks of sheet material into required numbers of predetermined sizes with a minimum of waste, the steps of laying out rectangular co-ordinates on a rectangular blank of sheet material with the abscissa corresponding to the length and the ordinate corresponding to the width, representing the rectangular blank on the rectangular co-ordinate by a point corresponding to the corner of the blank diagonally opposite from the origin of the co-ordinates, dividing the blank into four quadrants, similarly representing the required sizes on the rectangular co-ordinates with the required sizes being similarly positioning as said rectangular blank with respect to the co-ordinates, laying out on the blank a required size whose representative point is located in quadrant I, similarly representing the remaining pieces from said blank on said rectangular co-ordinates, and dividing each remaining piece into further required size whose width is closest to the width of the respective remaining piece.

23. In a method of programming the sequence of cutting operations in order to cut blanks of sheet material into required numbers of predetermined sizes with a minimum of waste, the steps of laying out rectangular co-ordinates on a rectangular blank of sheet material with the abscissa corresponding to the length and the ordinate corresponding to the width, representing the rectangular blank on the rectangular co-ordinates by a point corresponding to the corner of the blank diagonally opposite from the origin of the co-ordinates, dividing the blank into four quadrants, similarly representing the required sizes on the rectangular co-ordinates with the required sizes being similarly positioned as said rectangular blank with respect to the co-ordinates, dividing the blank into a required size whose reference point is located in the first quadrant to obtain the required size and two remaining pieces, and dividing a remaining piece into a required size whose representative point is located in the second quadrant and substantially symmetrical with respect to the central transverse axis of the blank to the required size.

24. In a method of programming the sequence of cutting operations in order to cut blanks of sheet material into required numbers of predetermined sizes with a minimum of waste, the steps of laying out rectangular co-ordinates on similar rectangular blanks of sheet material with the abscissa corresponding to the length and the ordinate corresponding to the width, representing the rectangular blanks on the rectangular co-ordinate by a point corresponding to the corner of the blank diagonally opposite from the origin of the co-ordinates, dividing the blank into four quadrants, similarly representing the required sizes on the rectangular co-ordinates with the required sizes being similarly positioned as said rectangular blank with respect to the co-ordinates, laying out on a corresponding plurality of blanks the required number of a first required size whose representative point is located in the first quadrant, and laying out on the remaining pieces of said plurality of blanks a required number of a second required size whose representative point is located in the second quadrant and is symmetrical to the first required size with respect to the central transverse axis of the blank.

25. In a method of programming the sequence of cutting operations in order to cut blanks of sheet material into required numbers of predetermined sizes with a minimum of waste, the steps of laying out rectangular co-ordinates on similar rectangular blanks of sheet material with the abscissa corresponding to the length and the ordinate corresponding to the width, representing the rectangular blanks on the rectangular co-ordinate by a point corresponding to the corner of the blank diagonally opposite from the origin of the co-ordinates, dividing the blank into four quadrants, similarly representing the required sizes on the rectangular co-ordinates with the required sizes being similarly positioned as said rectangular blank with respect to the co-ordinates, laying out on a corresponding plurality of blanks the required number of a first required size whose representative point is located in the first quadrant, and laying out on the remaining pieces of said plurality of blanks required sizes whose representative points are located in the second, third and fourth quadrants and whose widths are closest to the widths of the respective remaining pieces.

26. In a method of programming the sequence of cuting operations in order to cut blanks of sheet material into required numbers of predetermined sizes with a minimum of waste, the steps of laying out rectangular co-ordinates on similar rectangular blanks of sheet material with the abscissa corresponding to the length and the ordinate corresponding to the width, representing the rectangular blanks on the rectangular co-ordinate by a point corresponding to the corner of the blank diagonally opposite from the origin of the co-ordinates, dividing the blank into four quadrants, similarly representing the required sizes on the rectangular co-ordinates with the required sizes being similarly positioned as said rectangular blank with respect to the co-ordinates, laying out a first zone in the first quadrant enclosing representative points of required sizes, laying out a second zone in one of the other quadrants symmetrical to said first zone about at least one axis of the rectangular blank and enclosing the representative points of required sizes, and laying out a third zone in said first quadrant symmetrical to at least a portion of said second zone about at least one axis of the rectangular blank and enclosing representative points of further required sizes.

27. In a method of programming the sequence of cuting operations in order to cut blanks of sheet material into required numbers of predetermined sizes with a minimum of waste, the steps of laying out rectangular co-ordinates on similar rectangular blanks of sheet material with the abscissa corresponding to the length and the ordinate corresponding to the width, representing the rectangular blanks on the rectangular co-ordinate by a point corresponding to the corner of the blank diagonally opposite from the origin of the co-ordinates, dividing the blank into four quadrants, similarly representing the required sizes on the rectangular co-ordinates with the required sizes being similarly positioned as said rectangular blank with respect to the co-ordinates, laying out a required number of a first required size whose representative point is located in the first quadrant from a corresponding plurality of blanks, laying out on the remaining pieces of said plurality of blanks a number of a second required size whose representative point is located in the second quadrant and is substantially symmetrical to said first representative point about at least one axis of said blank, and laying out on additional blanks a required number of third sizes whose representative point is located in the first quadrant and is substantially symmetrical to said second size about at least one axis of said blank.

28. In a method of programming the sequence of cutting operations in order to cut blanks of sheet material into a required number of predetermined sizes with a minimum of waste, the steps of representing required sizes on a rectangular blank of sheet material to define a diverging zone, symmetrically positioning the diverging zone with respect to the central vertical axis of the rectangular blank to define a second diverging zone with there being an area common to both diverging zones divided by the central vertical axis, symmetrically positioning the halves of the common area with respect to their adjacent boundary lines of the respective divergent zones to obtain additional areas with said additional areas and halves of the common area defining a fundamental area, and a laying out of required sizes and groups of required sizes so that the reference points thereof are concentrated in the fundamental area.

29. In a method of programming the sequence of cutting operations in order to cut blanks of sheet material into a required number of predetermined sizes with a minimum of waste, the steps of representing required sizes on a rectangular blank of sheet material to define a diverging zone, symmetrically positioning the diverging zone with respect to the central vertical axis of the rectangular blank to define a second diverging zone with there being an area common to both diverging zones divided by the central vertical axis, symmetrically positioning the halves of the common area with respect to their adjacent boundary lines of the respective divergent zones to obtain additional areas with said additional areas and common area defining a fundamental area and required sizes and groups thereof are required reference points and laying out smaller pieces, and laying out smaller pieces within the mental area, and laying if the req... obtain the smallest dif... pieces and the smaller...

30. In a method... ting operations... into a requi... minimum... sizes...